Aug. 21, 1934. F. A. SCHROEDER Re. 19,281

REAMER FOR EARTH BORING BUCKETS

Original Filed March 24, 1932 2 Sheets-Sheet 1

INVENTOR

Frederick A. Schroeder

BY

Cooper, Kerr & Dunham

ATTORNEY

REAMER FOR EARTH BORING BUCKETS

Original Filed March 24, 1932 2 Sheets-Sheet 2

INVENTOR
Frederick A. Schroeder
BY
Cooper, Kerr & Dunham
ATTORNEY

Reissued Aug. 21, 1934 Re. 19,281

UNITED STATES PATENT OFFICE 19,281

REAMER FOR EARTH-BORING BUCKETS

Frederick A. Schroeder, Rochelle Park, N. J., assignor to Raymond Concrete Pile Company, New York, N. Y., a corporation of New Jersey Original No. 1,916,691, dated July 4, 1933, Serial No. 600,840, March 24, 1932. Application for reissue June 13, 1934, Serial No. 730,528

17 Claims. (Cl. 255—76)

This invention pertains to a rotary earth boring bucket, with special reference to an adjustable reamer mounted on the bucket, by means of which the hole bored by the bucket may be enlarged or reamed to a predetermined diameter.

An object of the present invention is to disclose improved apparatus for adjusting the operative diameters of earth boring tools such as rotary buckets, scarifiers, etc.

Another object is to provide means for adjusting the operative diameter of a tool before said tool is in operative position in the hole in the ground together with means for automatically expanding said tool to the operative diameter while the tool is in operative position in the hole in the ground.

Another object of the present invention is to disclose a reamer simple in design, cheap to manufacture, and with little likelihood to get out of order and service.

Further and other objects and advantages will be apparent from the specification and claims, and from the accompanying drawings which illustrate what is now considered the preferred embodiment of the invention.

Figure 1:
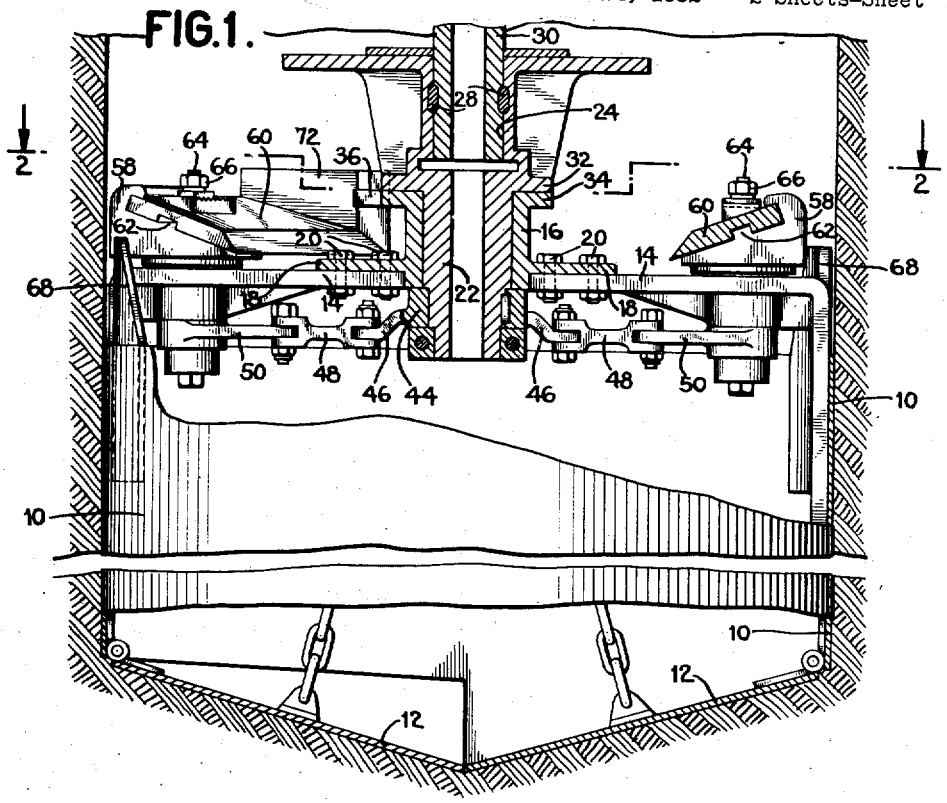
Fig. 1 is a vertical cross-section through the center of the bucket, on line 1—1 of Fig. 2 showing reamer retracted.

Referring to the drawings, the rotary bucket comprises a shell 10, discharge gates 12, and bails 14, the downwardly projecting arms of the bails being attached to the bucket shell 10.

Mounted on bails 14 axially of the bucket is a drive hub 16 having an integral flange 18 through which pass bolts 20 securing it to the bails.

Passing vertically through the bore of nub 16 is the hollow drive spindle 22. The portion of the spindle within hub 16 is cylindrical and free to rotate through a limited angle with relation to hub 16, as will be explained. The upper portion of spindle 22 is provided with a square socket 24 into which is secured, by keys 28, the lower end of the rotatable drive shaft 30.

The weight of spindle 22 and its attachments is supported on the top of hub 16 through flange 32 of the spindle resting on flange 34 of the hub.

Flange 34 of the hub has two diametrically opposed forward-drive ears 36, and two reverse-drive ears 38. Flange 32 of the spindle has two diametrically opposed drive lugs 40, each projecting downwardly into the space between an ear 36 and an ear 38 of the hub, as may best be seen in Figs. 2 and 3. It will be apparent that spindle 22 may rotate relatively to hub 16 through an angle represented by line 42, and that when lugs 40 are against ears 36 (Fig. 3) the spindle is in position to rotate hub 16 and bucket 10 clockwise, which is the operative direction of rotation. If the direction of rotation of the spindle be reversed, lugs 40 will rotate through angle 42 from the position of Fig. 3 to the position of Fig. 2, in which lugs 40 are against ears 38. Further rotation of the spindle in that reverse direction will cause hub 16 and the bucket to rotate to the left (counter-clockwise).

Figure 6:
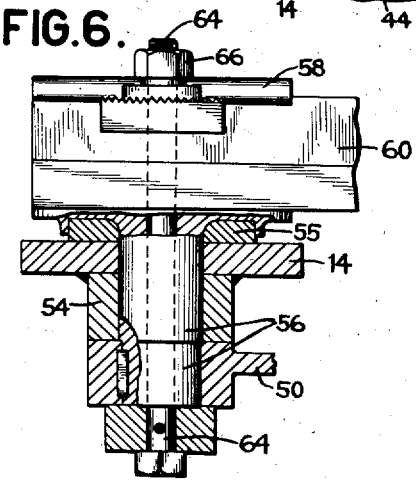
Fig. 6 is a fragmentary view on line 6—6 of Fig. 2.
Figure 7:
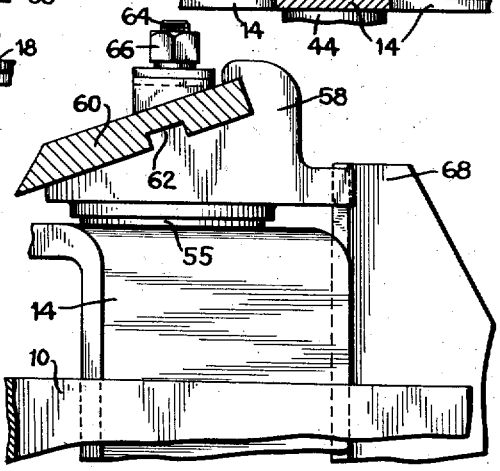
Fig. 7 is a fragmentary view on line 7—7 of Fig. 3.

Keyed to spindle 22 below hub 16 is a collar 44 having a pair of diametrically opposed arms 46, the outer ends of which are connected by links 48 to crank arms 50, the hubs of which are keyed to the lower end of vertical spindle 56 (Fig. 6) supported for rotation by bails 14 and bearing-blocks 54 and 55 welded to the under and upper sides of the bails. The upper end of each spindle 56, above bail 14, is shaped to form a support 58 for a reamer blade 60, adjustable lengthwise relatively to the support on a guideway 62 forming part of the support.

Bolt 64 and nut 66 serve to hold the blade in adjusted position.

Figure 2:
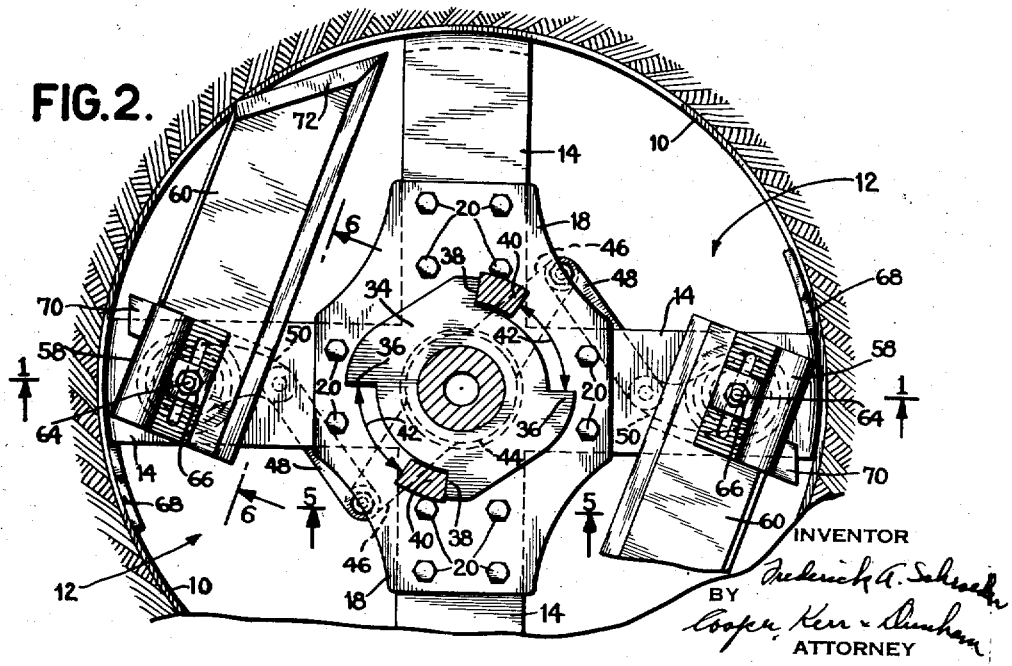
Fig. 2 is a cross-section on line 2—2 of Fig. 1.
Figure 3:
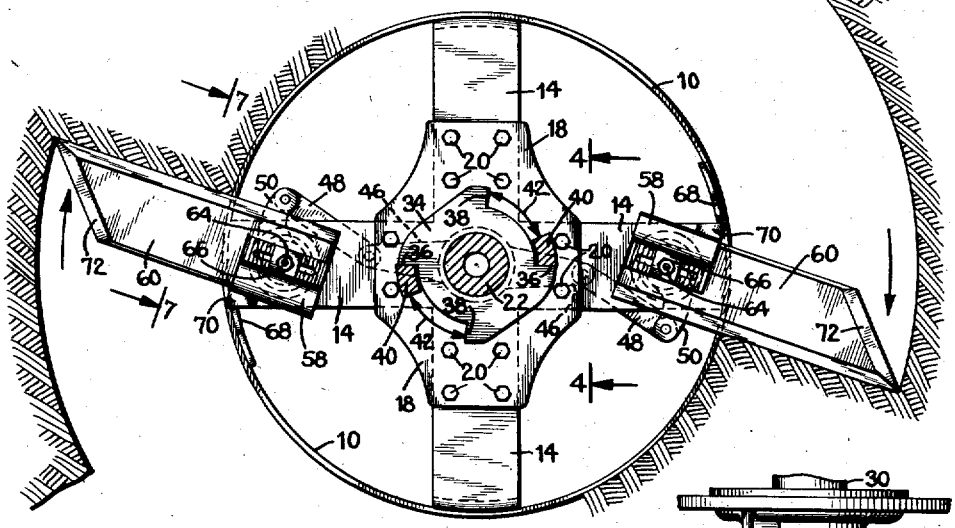
Fig. 3 is a view similar to Fig. 2 but with reamer blades in operative positions.
Figure 4:
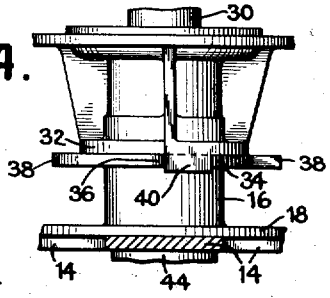
Fig. 4 is a fragmentary view on line 4—4 of Fig. 3.
Figure 5:
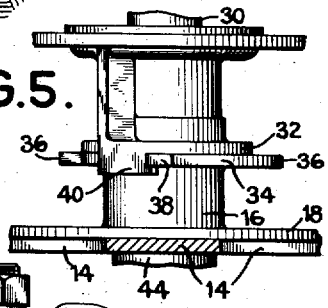
Fig. 5 is a fragmentary view on line 5—5 of Fig. 2.

The relationship of arms 46, links 48, arms 50, blades 60, and other parts of the apparatus is such that whenever lugs 40 of drive spindle 22 are against ears 38, as in Fig. 2, spindles 56 have been rotated to retract reamer blades 60 until no parts of the blades project beyond the bucket. On the other hand, whenever spindle 22 is rotated to place lugs 40 against ears 36, spindles 56 are rotated to move the reamer blades outwardly to their operative positions as in Fig. 3. Further rotation of spindle 22 in the direction of the arrow will cause the reamer blades to enlarge the hole dug by the bucket, the diameter of the hole depending on the adjusted position of blades 60 relatively to support 58.

The torque reaction of the blades is taken by stop plates 68 projecting above the bucket shell and welded thereto, the reaction reaching plates 68 through stop-lugs 70 forming a part of supports 58.

From the above it will be apparent that the reamer blades are automatically forced outwardly to their operative positions whenever the bucket is rotated clockwise against any resistance sufficient to bring drive lugs 40 against ears 36; that the effective diameter of the reamer is predetermined by the adjustment of the blades in supports 58; and that the reamer blades are retracted whenever drive spindle 22 rotates counter-clockwise relatively to the bucket, complete reaction being attained when lugs 40 reach ears 38.

If desired, the reamer blades may be formed with upturned outer ends as shown at 72 (Fig. 1) so as to aid in scooping the detritus into the bucket.

It is to be understood that the invention is not limited to the specific embodiment herein illustrated and described, but may be used in other ways without departure from its spirit as defined by the following claims.

I claim:

1. In apparatus of the class described, in combination, a rotary digging bucket for boring a hole in the earth, a hole-enlarging reamer comprising blades mounted at the upper end of said bucket for swinging movement on vertical axes, and bucket rotating means for shifting the reamer blades from inoperative to operative reaming position while the bucket is in the hole in the ground.

2. In apparatus of the class described, in combination, a rotary digging bucket for boring a hole in the earth, a hole-enlarging reamer comprising blades mounted at the upper end of said bucket for swinging movement on vertical axes, means rotatable for rotating said bucket in the hole, and means interconnecting said rotatable means and said blades whereby said rotatable means may be actuated to move said blades about their pivots on said bucket while the bucket is in the hole in the ground.

3. In apparatus of the class described, in combination, a rotary digging bucket for boring a hole in the earth, a hole-enlarging reamer comprising blades mounted at the upper end of said bucket for swinging movement on vertical axes, means rotatable for rotating said bucket in the hole and links connecting said rotatable means and said blades whereby said rotatable means may be actuated to move said blades about their pivots on said bucket while the bucket is in the hole in the ground.

4. In apparatus of the class described, in combination, a rotary digging bucket for boring a hole in the earth, a hole-enlarging reamer comprising blades mounted at the upper end of said bucket for swinging movement on vertical axes, a rotatable shaft for rotating said bucket in the hole and adapted for limited angular rotation relatively to said bucket, and means interconnecting said shaft and said blades whereby said shaft serves to swing said blades about their pivots when said shaft is rotated relatively to said bucket.

5. In apparatus of the class described, in combination, a rotary digging bucket for boring a hole in the earth, a member mounted at the upper end of said bucket for rotary movement on a vertical axis, a reamer blade supported by said member and adjustable cross the axis of said member, means rotatable for rotating said bucket in the hole, and means interconnecting said rotatable means and said member, whereby said rotatable means may be actuated to move said member about its pivot for swinging said reamer blade from inoperative to operative position.

6. In apparatus of the class described, in combination, a rotary digging bucket for boring a hole in the earth, a member mounted at the upper end of said bucket for rotary movement on a vertical axis, a reamer blade supported by said member and adjustable across the axis of said member, a rotatable shaft for rotating said bucket in the hole and having a limited angular movement relatively thereto, a crank arm on said shaft, a crank arm on said member and a link interconnecting said arms whereby said shaft when moved angularly relatively to the bucket serves to shift the blade from inoperative to operative position.

7. In apparatus of the class described, in combination, a rotary digging bucket for boring a hole in the ground, reamer blades pivotally mounted on said bucket, and means operating to first move the blades to their operating radius and then rotate the bucket in the hole.

8. In apparatus of the class described, in combinaton, a rotary digging bucket having cutters at its lower end arranged to cut and throw detritus upwardly into the bucket, hole reaming blades projecting laterally from the upper end of the bucket and arranged to cut and throw detritus into the upper end of the bucket, and means operating to throw the blades to operative position and then rotate the bucket, together with means for adjusting the operating radius of the blades.

9. Apparatus of the class described, comprising in combination, a rotary digging bucket for boring a hole in the ground, a cutter associated with said bucket, means rotatable for rotating said bucket, and means interconnecting said rotatable means, said bucket, and said cutter whereby said rotatable means may be moved relative to said bucket for the purpose of expanding or retracting said cutter.

10. Apparatus of the class described, comprising in combination, a rotary digging bucket, a cutter associated with said bucket, an axial shaft for rotating said bucket, and a lost-motion device interconnecting said shaft, said bucket and said cutter whereby said shaft may rotate relative to said bucket for the purpose of expanding or retracting said cutter.

11. In combination, a rotary bucket for boring a hole in the ground, means rotatable for rotating said bucket, a cutter associated with said bucket and said rotatable means, said rotatable means being operative while the bucket is in the hole in the ground for moving the cutter to its operating radius, and means selectively set by the operator before the bucket is lowered into the hole for determining the operating radius of the cutter.

12. In combination, a rotary bucket for boring a hole in the ground, means rotatable for rotating said bucket in said hole, a cutter operatively supported by said bucket and operatively connected to said rotatable means, said rotatable means being effective to expand or retract said cutter at the will of the operator while said bucket is in said hole, and means for predetermining the operating radius of said cutter.

13. Apparatus of the class described, comprising in combination, a rotating digging bucket for boring a hole in the ground, a cutter associated with said bucket, means rotatable for rotating said bucket and said cutter in either direction, means operated by said rotatable means whereby the initial movement of said rotatable means in either direction is effective to move said cutter either outwardly or inwardly relative to said bucket.

14. Apparatus of the class described, comprising in combination, a rotating digging bucket for boring a hole in the ground, a cutter associated with said bucket, means rotatable for rotating said bucket and said cutter in either direction, means operated by said rotatable means whereby the initial movement of said rotatable means in either direction is effective to move said cutter either outwardly or inwardly relative to said bucket and means settable by the operator before the bucket is lowered into the hole for limiting the said movement of said cutter.

15. Apparatus of the class described, comprising in combination, a rotatable digging bucket for boring a hole in the ground, a cutter associated with said bucket, means rotatable for rotating said bucket and said cutter, and means operable by said rotatable means whereby an initial movement of said rotatable means is effective to move said cutter either outwardly or inwardly relative to said bucket.

16. Apparatus of the class described, comprising in combination, a rotatable digging bucket for boring a hole in the ground, a cutter associated with said bucket, means rotatable for rotating said bucket and said cutter, and means operable by said rotatable means whereby an initial movement of said rotatable means in different directions is effective to move said cutter either outwardly or inwardly relative to said bucket, and further rotation of said rotatable means in the same direction is effective to rotate said bucket without moving said cutter relative thereto.

17. Apparatus of the class described, comprising in combination, a rotatable digging bucket for boring a hole in the ground, a cutter associated with said bucket, means rotatable for rotating said bucket and said cutter, means interconnecting said rotatable means and said bucket whereby said rotatable means may move relative to said bucket, and means interconnecting said cutter and said rotatable means whereby said movement of said rotatable means relative to said bucket serves to move said cutter relative to said bucket.

FREDERICK A. SCHROEDER.